(12) United States Patent
Krishna

(10) Patent No.: US 11,727,358 B1
(45) Date of Patent: Aug. 15, 2023

(54) LINKING FUNCTIONALITY BETWEEN DISTINCT DOCUMENT AND WORKFLOW MANAGEMENT SYSTEMS

(71) Applicant: Wells Fargo Bank, N.A., San Francisco, CA (US)

(72) Inventor: Radhika Sajja Krishna, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 49 days.

(21) Appl. No.: 17/541,895

(22) Filed: Dec. 3, 2021

(51) Int. Cl.
*G06Q 10/10* (2023.01)
*G06Q 10/107* (2023.01)

(52) U.S. Cl.
CPC ......... *G06Q 10/103* (2013.01); *G06Q 10/107* (2013.01)

(58) Field of Classification Search
CPC .......................... G06Q 10/103; G06Q 10/107
See application file for complete search history.

(56) References Cited

U.S. PATENT DOCUMENTS

| | | | |
|---|---|---|---|
| 6,249,807 B1 | 6/2001 | Shaw et al. | |
| 7,742,178 B2 | 6/2010 | Ducato et al. | |
| 8,443,045 B2 | 5/2013 | Thomas et al. | |
| 9,934,487 B2 | 4/2018 | Andersen et al. | |
| 10,417,440 B2 | 9/2019 | Reedy et al. | |
| 10,673,793 B2 | 6/2020 | Mutha et al. | |
| 10,917,370 B2 | 2/2021 | Masterson et al. | |
| 2004/0064473 A1* | 4/2004 | Thomas | G06Q 10/107 707/999.102 |
| 2006/0248155 A1 | 11/2006 | Bondarenko et al. | |
| 2011/0119102 A1* | 5/2011 | Horn | G06Q 10/06 709/206 |
| 2018/0322303 A1* | 11/2018 | Reedy | G06F 21/6218 |
| 2019/0372922 A1* | 12/2019 | Masterson | H04L 51/046 |

OTHER PUBLICATIONS

Alresco, "Using Outlook Integration" Hyland Software, Inc., 2021, retrieved Nov. 29, 2021 from https://docs.alfresco.com/microsoft-outlook/latest/using/ (Year: 2021).
Valkonen, Juho, "Document Management for Small Business," Turun Ammattikorkeakoulu Turku University of Applied Sciences, 2015, pp. 1-69, retrieved Nov. 29, 2021 from https://www.theseus.fi/bitstream/handle/10024/98087/Valkonen_Juho.pdf?sequence=1 (Year: 2015).

* cited by examiner

*Primary Examiner* — Chris Parry
*Assistant Examiner* — Steven C Nguyen
(74) *Attorney, Agent, or Firm* — Foley & Lardner LLP

(57) ABSTRACT

Disclosed is an approach that enables users of a workflow automation software system (WASS) to allow other users unable to use the WASS to access computer files in the WASS. A first user with access to the WASS may request that an email message be sent to a second user to give the second user access to a computer file. A string having a fixed portion and a variable portion may be inserted into the body of the email message. The WASS may request a unique document identifier (UDI) for the computer file from the DMS. The UDI or a variation thereof may be inserted into the variable portion to form a modified string. The email message may be sent with the modified string as a uniform resource locator (URL) that allows the second user to use the URL to access one or more files or folders via the DMS.

17 Claims, 7 Drawing Sheets

LINKING FUNCTIONALITY BETWEEN DISTINCT DOCUMENT AND WORKFLOW MANAGEMENT SYSTEMS

BACKGROUND

Various workflow management systems help users develop, store, and share data with others in an organization. Many of these workflow management systems require authorization for a user to update, receive, or otherwise access processes and files within the automated workflow. For example, many workflow management systems may only provide access to each process and corresponding document(s) to individuals who are suitably credentialed to access the workflow management system. In some circumstances, an information technology enterprise or other enterprise or organization using the workflow management systems may limit a number of users authorized to access the workflow management systems to reduce costs (e.g., the cost of a license) and/or increase security of the workflow management systems. However, limiting user access to the workflow management systems may lead to many users not having access to certain necessary documents, data, and/or other pertinent information in connection with processes in the workflow management systems. Such documents may be accessible via a separate document management system, but users would not know which of the potentially vast number of electronic files in the document management system are relevant to particular processes at particular times.

SUMMARY OF THE INVENTION

Various embodiments of the disclosure relate to uploading and linking functionality between one or more document management systems and one or more distinct workflow management systems. At least one aspect of the present disclosure is directed to a computer-implemented method. The method can include generating, by a workflow automation software system (WASS) executing on a first computing system, a task process configured for sending electronic mail (email) messages to users who do not have access to the WASS, the task process comprising a first operation and a second operation. The method can further include adding, by the WASS, to a document management system (DMS) that is separate from the WASS and that executes on the first computing system or a second computing system, a computer file uploaded into the WASS. The method can further include receiving, by the WASS, from a first user with access to the WASS, a request to send an email message according to the task process, wherein the request identifies (1) the computer file and (2) a recipient who is a second user without access to the WASS. The method can further include performing, by the WASS, the first operation in response to receiving the request to send the email message, the first operation comprising inserting into a body of the email message a string having a fixed portion and a variable portion, wherein the fixed portion corresponds to the DMS. The method can further include requesting, by the WASS, from the DMS, a unique document identifier for the computer file. The method can further include performing, by the WASS, the second operation in response to receiving the unique document identifier from the DMS, wherein the second operation comprises inserting, into the variable portion of the string, the unique document identifier or a variation of the unique document identifier to form a modified string comprising the fixed portion. The method can further include transmitting, by the WASS, via an email server, the email message to an email address of the second user, the body of the transmitted email message comprising the modified string as a uniform resource locator (URL) that allows the second user to access via the DMS, by selecting the URL, the computer file without accessing the WASS.

At least one aspect of the present disclosure relates to a computing system comprising a processor and a memory comprising instructions that, when executed by the processor, cause the processor to generate, by a workflow automation software system (WASS), a task process configured for sending electronic mail (email) messages to users who do not have access to the WASS, the task process comprising a first operation and a second operation. The instructions further cause the processor to add, by the WASS, to a document management system (DMS) that is separate from the WASS, a computer file uploaded to the WASS. The instructions further cause the processor to receive, by the WASS, from a first user with access to the WASS, a request to send an email message according to the task process, wherein the request identifies (1) the computer file and (2) a recipient who is a second user without access to the WASS. The instructions further cause the processor to perform, by the WASS, the first operation in response to receiving the request to send the email message, the first operation comprising inserting into a body of the email message a string having a fixed portion and a variable portion, wherein the fixed portion corresponds to the DMS. The instructions further cause the processor to request, by the WASS, from the DMS, a unique document identifier for the computer file. The instructions further cause the processor to perform, by the WASS, the second operation in response to receiving the unique document identifier from the DMS, wherein the second operation comprises inserting, into the variable portion of the string, the unique document identifier or a variation of the unique document identifier to form a modified string comprising the fixed portion. The instructions further cause the processor to transmit, by the WASS, via an email server, the email message to an email address of the second user, the body of the transmitted email message comprising the modified string as a uniform resource locator (URL) that allows the second user to access via the DMS, by selecting the URL, the computer file without accessing the WASS.

At least one aspect of the present disclosure relates to a computer-readable storage medium comprising instructions that, when executed by a processor, cause the processor to generate, by a workflow automation software system (WASS), a task process configured for sending electronic mail (email) messages to users who do not have access to the WASS, the task process comprising a first operation and a second operation. The instructions further cause the processor to add, by the WASS, to a document management system (DMS) that is separate from the WASS, a computer file uploaded to the WASS. The instructions further cause the processor to receive, by the WASS, from a first user with access to the WASS, a request to send an email message according to the task process, wherein the request identifies (1) the computer file and (2) a recipient who is a second user without access to the WASS. The instructions further cause the processor to perform, by the WASS, the first operation in response to receiving the request to send the email message, the first operation comprising inserting into a body of the email message a string having a fixed portion and a variable portion, wherein the fixed portion corresponds to the DMS. The instructions further cause the processor to request, by the WASS, from the DMS, a unique document identifier for the computer file. The instructions further cause the processor to perform, by the WASS, the second operation in response to receiving the unique document identifier from the DMS, wherein the second operation comprises inserting, into the variable portion of the string, the unique document identifier or a variation of the unique document identifier to form a modified string comprising the fixed portion. The instructions further cause the processor to transmit, by the WASS, via an email server, the email message to an email address of the second user, the body of the transmitted email message comprising the modified string as a uniform resource locator (URL) that allows the second user to access via the DMS, by selecting the URL, the computer file without accessing the WASS.

These and other features, together with the organization and manner of operation thereof, will become apparent from the following detailed description and the accompanying drawings.

DETAILED DESCRIPTION

Figure 1:
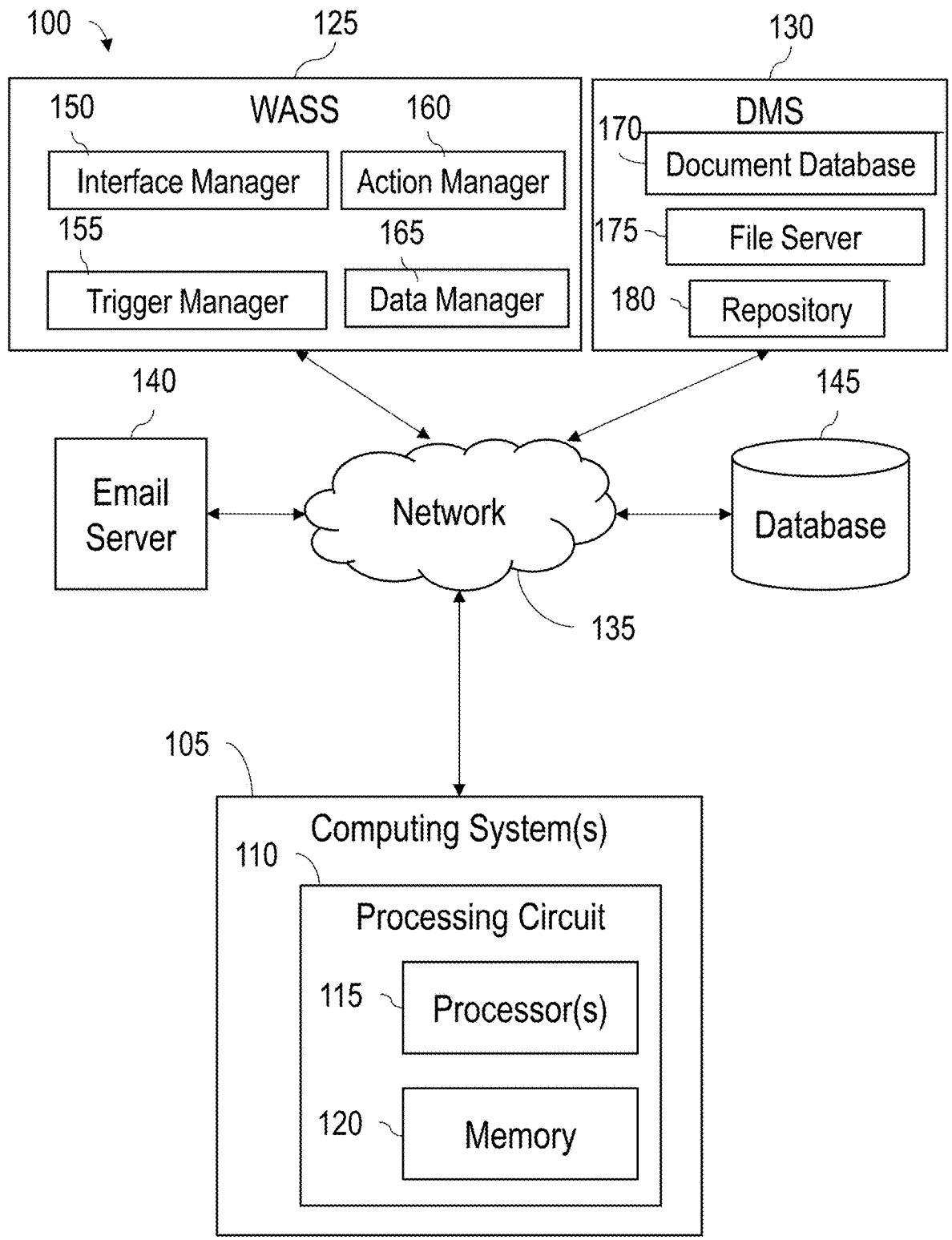
FIG. 1 is a block diagram of an illustrative example system for uploading and linking functionality between a document management system and a distinct workflow management system, in accordance with various potential embodiments.

Referring generally to the Figures, systems, methods and devices for uploading and linking functionality between one or more document management systems and one or more workflow management systems (such as "Alfresco Process Services," "Quickbase," "ClickUp," "OnTask," "Collavate," "Adobe Workfront," "ProntoForms," "FunctionFox," "Shift," "Asana," and/or other similar systems are provided herein) that is distinct from (i.e., can function independently and employ its own authentication protocols for giving access to users) the one or more document management systems. Systems and methods of the present disclosure include a system to receive a request to initiate generating a task process within the workflow management system. According to the present disclosure, the request can include an email sent to a common mailbox from a requester of an organization associated with the workflow management system. In some cases, the requester may not have access to the workflow management system (e.g., the requester may not have a granted license to access the workflow management system). An email listener of the workflow management system can monitor the common mailbox and can subsequently create an instance in the workflow in response to receiving the request. One or more individuals or other portions of the system can then process the request and upload processed files or documents within the workflow. Processing the request may include creating a query in the workflow management system. One or more components of the system may resolve the query. For example, one or more components of the system may upload the files or documents to a document management system associated with the enterprise. The document management system may include any system to store and manage documents, such as a custom document management system of an organization, "Microsoft SharePoint," "eFileCabinet," "Google Workspace," "OneDrive," "iCloud," "Dropbox Business," "Box," or another similar document management system. As used herein, custom, customized, or custom-tailored systems and software are homegrown, bespoke, or otherwise specially developed for the enterprise, for a particular purpose or for the needs of particular users. The one or more components of the system may further resolve the query by uploading various additional information such as date and time of the request, identification information of the requestor, a taskforce of the enterprise that the requester is associated with, and/or other similar data points.

The system can provide a distinct link to each of the uploaded documents of the document management system, or to a computer folder or bin with one or more computing files, using variables as a URL link to the requestor via the workflow management system (e.g., via an automated email) in response to the request. For example, the requestor, who doesn't have access to the workflow management system, can still receive an automated email with resolution notes and the distinct generated link to view the processed computer files or documents. In some cases, the system can automatically reference the attachment as a unique URL link into the email tasks. In some cases, the URL link may correspond to a distinct document instead of a folder or bin including a plurality of documents. In such circumstances, the requester may receive access to one particular document or file rather than to a plurality of files.

The systems and methods described herein may have many benefits over existing systems for uploading and/or linking functionality between distinct document and workflow management systems. For example, by providing an automated email message through a workflow management system with a unique link to a distinct computer file within a document management system, the systems and methods herein may provide additional or alternative means of accessing the particular computer file(s) typically associated with or linked to particular tasks or workflows in the workflow management system even when a recipient of the email message does not have access to the workflow management system. Furthermore, by providing a link directly to the distinct computer file, as compared to a computer folder or bin containing several additional computer files within the workflow management system, the systems and methods herein may improve security of the system by reducing unauthorized access to documents within the workflow management system and by reducing unnecessary sorting and/or parsing through the additional computing files (e.g., within a folder or bin) to locate the distinct document. As another example of improvements or benefits of the systems and methods described herein, since typical workflow management systems do not provide quick access to a distinct document without access to the workflow management system, the systems and methods described herein may provide a quick and efficient way of accessing a distinct document using a document management system without needing to purchase an additional license to the workflow management system. Therefore, the systems and methods described herein may provide a more efficient way of uploading and linking functionality between distinct document and workflow management systems. Various other technical benefits and advantages are described in greater detail below.

Referring to FIG. 1, a block diagram depicting an example of a system 100 is shown, according to some arrangements. As shown, the system 100 may include, among other systems, at least one computing system 105, a workflow automation software system (WASS) 125, and a document management system 130. Each of the above described systems may communicate through a telecommunications network 135, which may include one or more of the Internet, local area network, wide area network, Cellular network, Wi-Fi, Wi-Max, a proprietary banking network, and so on. Each system and device in system 100 may include, for communicating via network 135, a network interface device and network interface logic that may include, for example, program logic that connects the system or device to the network 135 or to other systems and devices. The network interface logic may facilitate secure communications between each system and/or device of the system 100. The network interface logic may also facilitate communication with other entities, such as other computing devices. The network interface logic may include user interface program logic configured to communicate with client applications running on other computing systems and devices, and generate and present web pages to users accessing a computing system over the network 135.

The computing systems 105 may be used by individual users (e.g., an employee, a consumer, and so on) to initiate and/or use a task process in the workflow automation software system 125. The computing systems 105, for example, may be or may comprise personal computers (e.g., desktops or laptop computers), smartphones, tablet computers, wearable devices such as smartwatches, smart assistants/smart speakers, a personal digital assistant, a portable gaming device, or other suitable device. In some embodiments, the computing systems 105 may be part of, or may be replaced by, one or more servers, each with one or more processors configured to execute instructions stored in memory. Each computing system 105 may include a processing circuit 110 having one or more processors 115 and memory 120 to perform and store various operating instructions described herein.

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, cause the processing circuit to perform one or more of the operations described herein. The memory may also store parameter data to affect presentation of one or more resources, animated content items, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as ActionScript®, C, C++, C#, Java®, JavaScript®, JSON, Perl®, HTML, HTML5, XML, Python®, and Visual Basic®.

The operations described in this disclosure can be implemented as operations performed by a data processing apparatus on data stored on one or more computer-readable storage devices or received from other sources. The terms "data processing system" or "processor" encompass all kinds of apparata, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

In some arrangements, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and/or implemented on the same circuit or chip as the one or more processing circuits.

Some implementations include multiple layers or levels of cache memory, each further removed from the one or more processing circuits. Some implementations include multiple processing circuits and/or coprocessors that augment the one or more processing circuits with support for additional specialized instructions (e.g., a math coprocessor, a floating point coprocessor, and/or a graphics coprocessor). The coprocessor can be closely connected to the one or more processing circuits. However, in some arrangements, the coprocessor is integrated into the one or more processing circuits or implemented on the same circuit or chip as the one or more processing circuits. In some implementations, the coprocessor is further removed from the one or more processing circuits, e.g., connected to a bus. Details regarding processing circuits, memory, and instructions are further explained in detail with reference to FIG. 6.

Further referring to the components of FIG. 1, the computing systems 105 are communicatively coupled, via a database 145, server 140, and/or the network 135, to the workflow automation software system 125 and the document management system 130 such that the workflow automation software system 125 and the document management system 130 can execute via the computing systems 105. The workflow automation software system 125 may be or may include one or more workflow management systems such as "Alfresco Process Services," "Quickbase," "ClickUp," "OnTask," "Collavate," "Adobe Workfront," "Pronto-Forms," "FunctionFox," "Shift," "Asana," and/or other similar systems. The document management system 130 may be or may include any system to store and manage documents, such as a particular custom document management system of the enterprise, or solutions such as "Microsoft SharePoint," "eFileCabinet," "Google Workspace," "OneDrive," "iCloud," "Dropbox Business," "Box," or another document management system. In some embodiments, the document management system 130 is separate from the workflow automation software system 125. In some embodiments, the document management system 130 executes on the same computing system 105 that the workflow automation software system 125 executes on (e.g., via one computing device). In some embodiments, the document management system 130 executes on a different computing system 105 than the workflow automation software system 125 (e.g., via two distinct computing devices). In some embodiments, the workflow automation software system 125 and the document management system 130 can both operate on the same system over the network 135 such that the workflow automation software system 125 and the document management system 130 can operate dependently. In some embodiments, the workflow automation software system 125 and the document management system 130 may operate independently from one another.

The computing system 105 may be configured to enroll with the workflow automation software system 125 for generating various executables, which may be task-specific, as described in greater detail below. The workflow automation software system 125 may include a plurality of managers. Each of the managers may be various combinations of hardware and/or software which are configured to perform various aspects of the systems and methods described herein. For example, each of the managers may include one or more of the components shown in FIG. 6. While the managers are described as performing specific steps of a task process, it is noted that, in some embodiments, one manager may cause another manager or device to perform a specific step or function of the task process. Accordingly, the present disclosure is not limited to the particular managers performing their respective steps. Additionally, some managers may be grouped with other managers to perform a group of steps. The workflow automation software system 125 may include an interface manager 150. The interface manager 150 may be any device, component, script, computer-code, or combination of software and/or hardware configured to provide an interface for configuring a task process used to generate an executable, as will be described in greater detail with reference to FIGS. 2-5.

The workflow automation software system 125 may include a trigger manager 155 and an action manager 160. The trigger manager 155 and action manager 160 may be any device, component, script, computer-code, or combination of software and/or hardware configured to provide and manage triggers and actions corresponding to an executable task process. Once each of the triggers and actions corresponding to a task process are selected and/or configured (e.g., by an administrator or other user), the task process may be compiled. For example, workflow automation software system 125 may include a data manager 165. The data manager 165 may be any device, component, script, computer-code, or combination of software and/or hardware configured to generate, build, assemble, or otherwise populate data structures for defining or otherwise configuring an executable, based on a task process configured using the computing system 105, as described in greater detail below. In this regard, the interface manager 150, trigger manager 155, action manager 160, and data manager 165 may operate together to configure a task process used to generate an executable.

As described in greater detail below, the interface manager 150 may be configured to provide an interface for generating a workflow which forms the basis of an executable task process. A user may provide various inputs to the user interface provided by the interface manager 150 for building a workflow using various triggers and actions (e.g., provided by the trigger manager 155 and action manager 160), which corresponds to one or more tasks. As the user configures or otherwise builds the workflow, the data manager 165 may be configured to generate and/or update different data structures from which information may be pulled to determine whether triggers of the workflow are satisfied and/or whether to perform operations identified in the workflow.

The workflow automation software system 125 may be configured to support various options for data sources. For example, the workflow automation software system 125 may support a manual data source (by including custom fields and editable values). The workflow automation software system 125 may support uploaded data files (e.g., spreadsheets, CSVs, etc.). Where the data source is a manual data source, the interface manager 150 may be configured to provide a series of interfaces for labeling the data source and building out a custom data set (e.g., by adding manual items, adding custom fields, adding corresponding values, etc. to populate a custom data set). Where a data source corresponds to an uploaded data file, the interface manager 150 may be configured to provide a series of interfaces for uploading the data file (e.g., a CSV) and identifying (and labeling) each of the rows in the data file.

The trigger manager 155 may be any device, component, script, computer-code, or combination of software and/or hardware configured to monitor and manage triggers corresponding to a workflow. Trigger, as used herein, refers to an occurrence, change, update, or other condition corresponding to a particular monitored item (e.g., an email message to a common mailbox as described below) which causes one or more actions to occur. In some embodiments, the trigger manager 155 may be configured to manage a plurality of triggers corresponding to a particular item.

The action manager 160 may be any device, component, script, computer-code, or combination of software and/or hardware configured to generate and manage actions corresponding to a trigger of the trigger manager 155. Action, as used herein, refers to a task, step or series of operations, or other form of an output which are to occur based on a particular trigger being satisfied. In other words, actions are to be performed responsive to a particular trigger. In some embodiments, the action manager 160 may be configured to generate and manage a plurality of actions corresponding to a particular trigger. In this regard, a particular trigger being satisfied may result in a plurality of actions being executed.

Further referring to the components in FIG. 1, the document management system 130 may include a document database 170, a file server 175, and a document repository 180. The file server 175 of the document management system 130 may include components similar to those shown in FIG. 6. The file server 175 may be configured to store a plurality of documents in a non-volatile storage area, such as a hard disk drive or NVRAM. The document database 170 may include information about documents and users of documents stored in the file server 175 (e.g., unique identifiers of documents). In addition to information identifying the users and documents, the document database 170 may also include information about the access rights the users have to respective documents stored in the file server 175. The document repository 180 may include stored documents and may be part of the file server 175, or, as shown, separate therefrom. The documents included in the document repository 180 may be stored in a non-volatile storage area, such as a hard disk drive or NVRAM.

The computing system(s) 105 may be configured to initiate, create, or otherwise generate a task process in the workflow automation software system 125. For example, the processing circuit 110 of a computing system 105 may be configured to generate a task process configured for sending electronic mail (email) messages to users who do not have access to the workflow automation software system 125. In some arrangements, the processing circuit 110 may be configured to receive a user input to the computing system 105 to initiate the generation of the task process. For example, as described in greater detail below, the processing circuit 110 may be configured to receive a user input to one or more portions of the computing system 105 (e.g., a keyboard input, a touchscreen input, etc.) corresponding to an indication to create and generate a task process in the workflow automation software system 125. In some embodiments, generating the tasks process includes using various "no-code" processes (e.g., drag-and-drop tasks) to create a workflow process and initiation the task process. For example, the processing circuit 110 may be configured to receive a selection of a workflow task item (e.g., by "clicking" on a display of the computing system 105) and a placement of the workflow task item within a task process (e.g., by "dragging" the item on the display). The processing circuit 110 may be configured to generate the task process in response to an indication to start the task process. In some examples, the indication to start the task process may be or may include a user input, an email, or the like. By way of non-limiting example, an example task process within the workflow automation software system 125 may include a task initiator (e.g., a start item), various assignment items (e.g., the first and second operations described herein), and a task completer (e.g., an end item).

Figure 2:
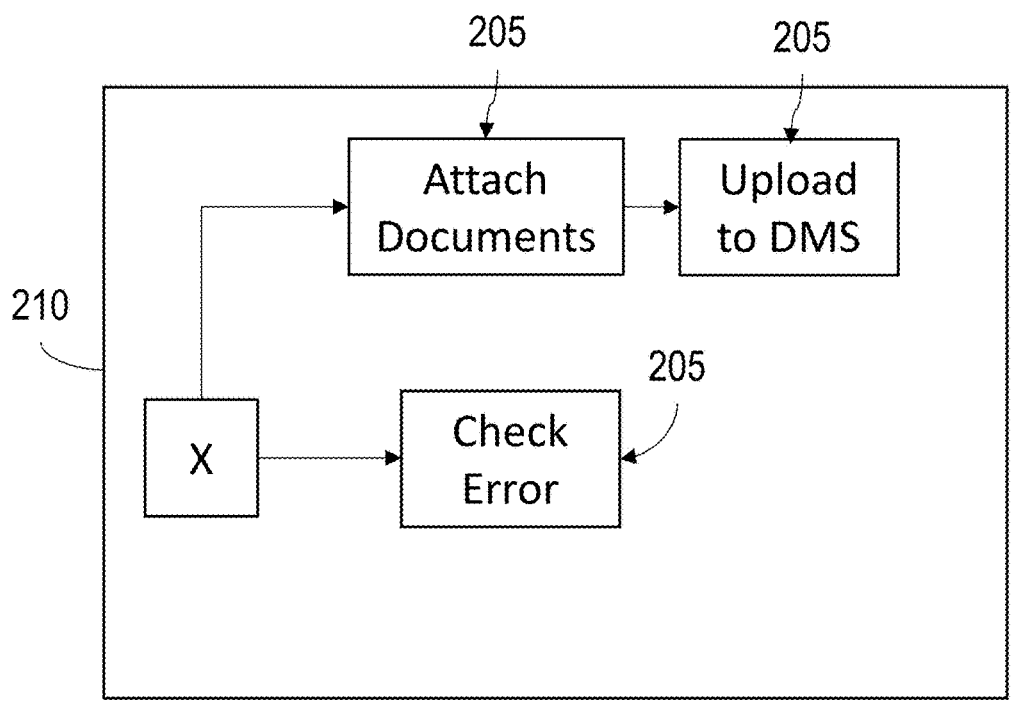
FIGS. 2-5 depict example graphical user interfaces depicting various functionality in accordance with various potential embodiments.

Referring now to FIG. 2, depicted is one example of a visual representation 200 or workflow or task process which corresponds to a workflow generated by the workflow automation software system 125 using data and/or inputs received from the computing system 105. The interface manager 150 may be configured to generate, build, assemble, or otherwise update data corresponding to the workflow generated using the computing system 105, as described in greater detail below.

As shown in FIG. 2, the interface manager 150 may be configured to provide an interface for a modular coding construct for generating a visual representation 200 which forms the basis of an executable task process. Executable refers to a combination of one or more data structures or databases which include data representing a version of a workflow (e.g., a protocol of the workflow) which is currently in deployment and executed by the workflow automation software system 125. In some embodiments, generating an executable can include users configuring a workflow. Users configuring a workflow for generating an executable (for example, one or more data structures or databases) may add objects 205 to a canvas region 210 (e.g., by dragging and dropping objects 205 onto the canvas 210, etc.). Once an object 205 is added, the user may configure the object 205 (e.g., by connecting one or more objects 205, etc.). The visual representation 200 may include a plurality of objects 205 (or modules) which together form a workflow for defining the executable. Each object 205 may correspond to a particular object type, which may include object types corresponding to particular triggers, and object types corresponding to particular actions. The interface manager 150 may include a plurality of object types which are selectable via the computing system 105 for configuring or generating a workflow. The interface manager 150 may be configured to generate or provide a user interface at the computing system 105 for constructing the visual representation 200. While an example visual representation 200 of a task process shown in FIG. 2 includes objects 205 corresponding to drag and drop tasks, various other appropriate methods can similarly be used to generate a task process including, but not limited to, script or computer-code. Additionally, the visual representation 200 shown in FIG. 2 is for illustrative purposes only and is not intended to limit the scope of the present disclosure.

In some embodiments, the task process may include at least two operations. Referring briefly to FIG. 2, each operation may correspond to one or more objects 205. In some embodiments, each operation may correspond to one or more operations transcribed in script and/or computer-code. The task process may include a first operation and a second operation. In some embodiments, the task process may include several additional operations. For example, the first operation and the second operation may be defined by the first user through the workflow automation software system 125. For example, as described in greater detail above, the computing system 105 may receive a user input to the workflow automation software system from the first user corresponding to directions to generate and execute the first operation and the second operation. With generation of the task process, the processing circuit 110 may be configured to add a file uploaded into the workflow automation software system 125 to the document management system 130. For example, the file may include any content item (e.g., document, image, etc.) uploaded into the workflow automation software system 125. In some embodiments, the file may be associated with a specific task process or workflow within the workflow automation software system 125. By way of non-limiting example, the workflow automation software system 125 may be a data and process workflow management system including tasks associated with various users of enterprise systems. Each task may include various files uploaded to the workflow automation software system 125 and associated with the task. The processing circuit 110 may be configured to add such files uploaded into the workflow automation software system 125 to the document management system 130.

In some embodiments, the processing circuit 110 may be configured to upload the computer file to the computing system 105 before adding the computer file to the document management system 130. For example, in some embodiments, the processing circuit 110 may be configured to receive the computer file and upload the computer file to the computing system 105 (e.g., store the computer file in memory 120 of the computing system 105) prior to adding the computer file to the document management system 130. In these embodiments, the processing circuit 110 may be configured to transmit (e.g., upload) the computer file to the document management system 130 from the computing system 105. For example, the processing circuit 110 may be configured to transmit a copy of the computer file to the one or more components of the document management system 130 such that the copy of the computer file may be stored in one or more components (e.g., the database 170, the repository, etc.) of the document management system 130. In some embodiments, the processing circuit 110 may be configured to transmit the computer file via the network 135 communicably coupled to the document management system 130 (e.g., via a file transfer protocol (FTP)).

In some embodiments, the computer file may be uploaded to a network location accessible through the workflow automation software system 125. For example, the processing circuit 110 may be configured to receive the network location of the computer file (e.g., via an extranet site, internet site, etc.) via the workflow automation software system 125 and the processing circuit 110 may be configured to transmit the network location to the document management system 130. In these embodiments, the processing circuit 110 may be configured to add the computer file to the document management system 130 by providing the network location to the document management system 130 (e.g., via the file server 175). In some embodiments, one or more components of the document management system 130 may be configured to generate the unique document identifier after the processing circuit of the document management system 130 receives the network location. In some embodiments, one or more components of the document management system 130 may be configured to automatically generate the unique document identifier after the computer file is uploaded. In some embodiments, one or more components of the document management system 130 may be configured to receive the document identifier from an external source. For example, one or more components of the workflow automation software system 125 may be configured to generate the document identifier in response to adding the computer file to the document management system 130. As another example, the computer file may have an original unique document identifier corresponding to the computer file (e.g., the identifier generated before the computer file is added to the document management system 130, when the computer file was originally created, etc.).

In some embodiments, the computer file is stored at a first network location accessible through the workflow automation software system 125 such that the processing circuit 110 may be configured to copy the computer file to a second network location accessible through the document management system 130. For example, the computer file may be stored at a first network location accessible through the workflow automation software system 125, but not through the document management system 130 (e.g., a network location within the workflow automation software system 125). In these embodiments, the processing circuit 110 may be configured to copy, via the workflow automation software system 125, the computer file to a second network location in which the second network location is accessible via the document management system 130 (e.g., via the file server 175). Each system may apply or require its own user authentication in determining whether to grant access to certain computer files, whether the system has its own copy of the files, or accesses the files from a location that is accessible to other systems.

The processing circuit 110 may be configured to receive, by the workflow automation software system 125, a request to send an email message according to the task process by the workflow automation software system 125. For example, the processing circuit 110 may be configured to receive a request from a first user that has access to (e.g., is authorized, has a granted license to, etc.) the workflow automation software system 125. In some embodiments, the received request may identify the computer file uploaded to the document management system 130 from the workflow automation software system 125 and a recipient who is a second user (e.g., different from the first user). In some embodiments, the second user may not have access to the workflow automation software system 125. In such circumstances, the second user may not have access to the workflow automation software system 125 to retrieve or otherwise access the uploaded file. In some embodiments, the request may include the computer file. For example, in some embodiments, the request may include the computer file as an attachment to the email message. In some embodiments, the workflow automation software system 125 may receive the email address from the request (e.g., via the attachment of the email message, via the body of the email message, etc.).

In some embodiments, the request may be or may include an email from a user to a common mailbox monitored via the workflow automation software system 125. For example, the trigger manager 155 of the workflow automation software system 125 may be configured to monitor a common mailbox of the workflow automation software system 125 and transmit the email request to the action manager 160 to generate the task process with the first and the second operations in response to receiving the email request. In some embodiments, the action manager 160 may be configured to create a query in response to the request. For example, the query can include a plurality of data points corresponding to action items to generate and perform the executable task process. By way of non-limiting example, the query may include a time and/or date of the request, the identified computer file of the request, the recipient, the email address of the recipient, the requestor, and/or expected resolution date (e.g., of the query).

The processing circuit 110 may be configured to perform, by the workflow automation software system 125, the first operation in response to receiving the request. For example, the first operation may be or may include inserting a string into a body of the email message. In some embodiments, as will be described in greater detail below, the string may include a fixed portion and a variable portion. For example, the fixed portion may identify or otherwise correspond to the document management system 130. In some embodiments, the fixed portion of the string may be or may include a network location corresponding to the document management system 130.

The processing circuit 110 may be configured to request, by the workflow automation software system 125, a unique document identifier for the computer file. For example, as will be described in greater detail below, the workflow automation software system 125 may be configured to request or otherwise obtain (e.g., by executing a script, generating an application programming interface (API) call, or calling a function) the unique document identifier. In various embodiments, the workflow automation software system 125 may acquire the unique document identifier from the document management system 130. In certain embodiments, the processing circuit 110 may be configured to prompt a user of the workflow automation software system 125 to provide a unique document identifier for the computer file (e.g., via the computing system 105). As discussed above, the unique document identifier may be or may include an identifier from the computer file itself, an identifier generated by the document management system 130, and/or an identifier generated by the workflow automation software system 125.

Figure 3:
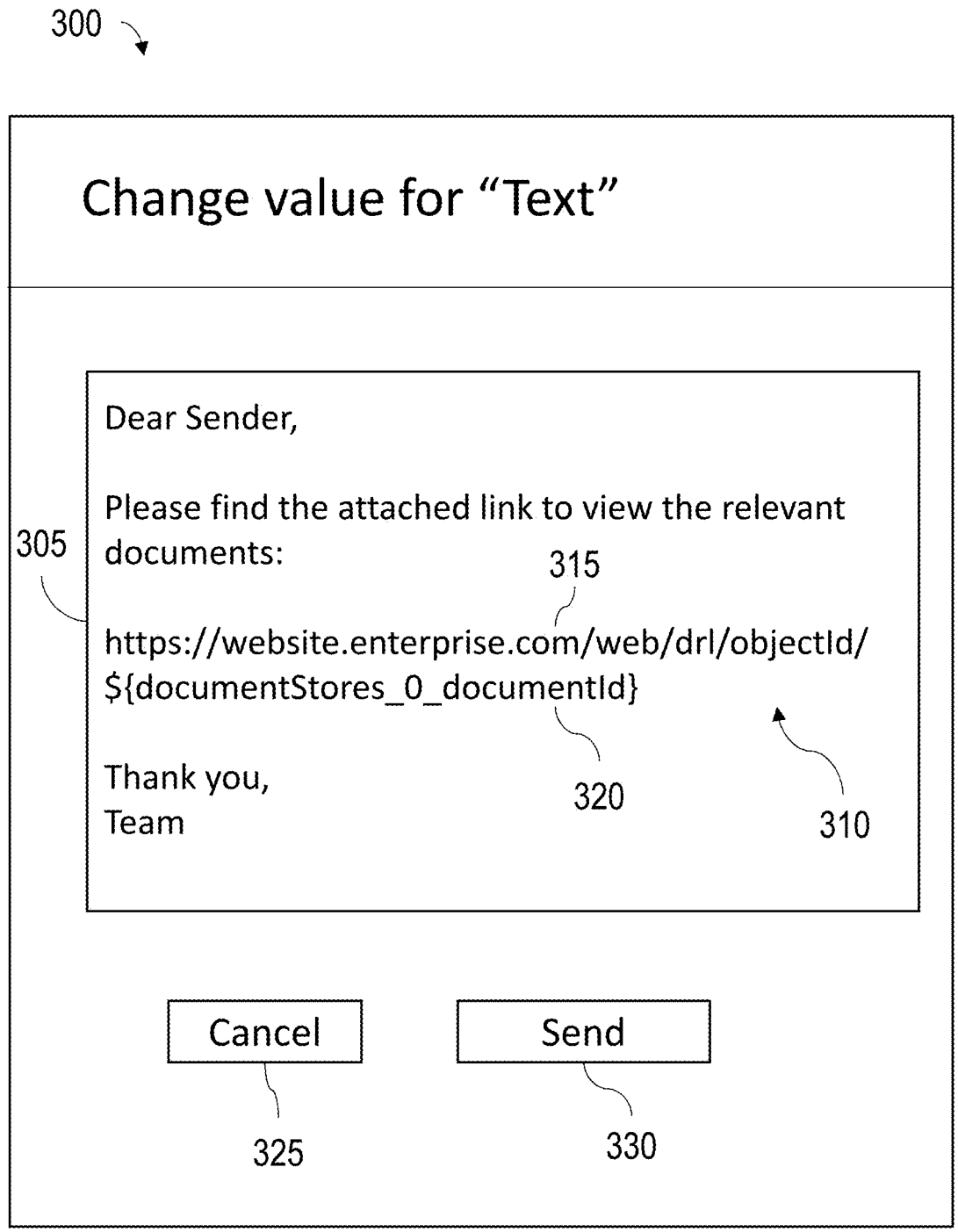

Referring now to FIG. 3, an example of a first graphical user interface 300 of the workflow automation software system 125 is shown. As shown in FIG. 3, the interface manager 150 of the workflow automation software system 125 may be configured to provide the string 310 (https://website.enterprise.com/web/drl/objectId/${documentStores_0_documentId} in FIG. 3) within a body 305 of an email. The string may comprise a fixed portion 315 (e.g., "https://website.enterprise.com/web/drl/objectId/" as shown in FIG. 3) and a variable portion 320 (e.g., "${documentStores_0_documentId}" as shown in FIG. 3. The interface manager 150 of the workflow automation software system 125 may be configured to obtain the unique document identifier (e.g., from the document management system 130).

Figure 4:
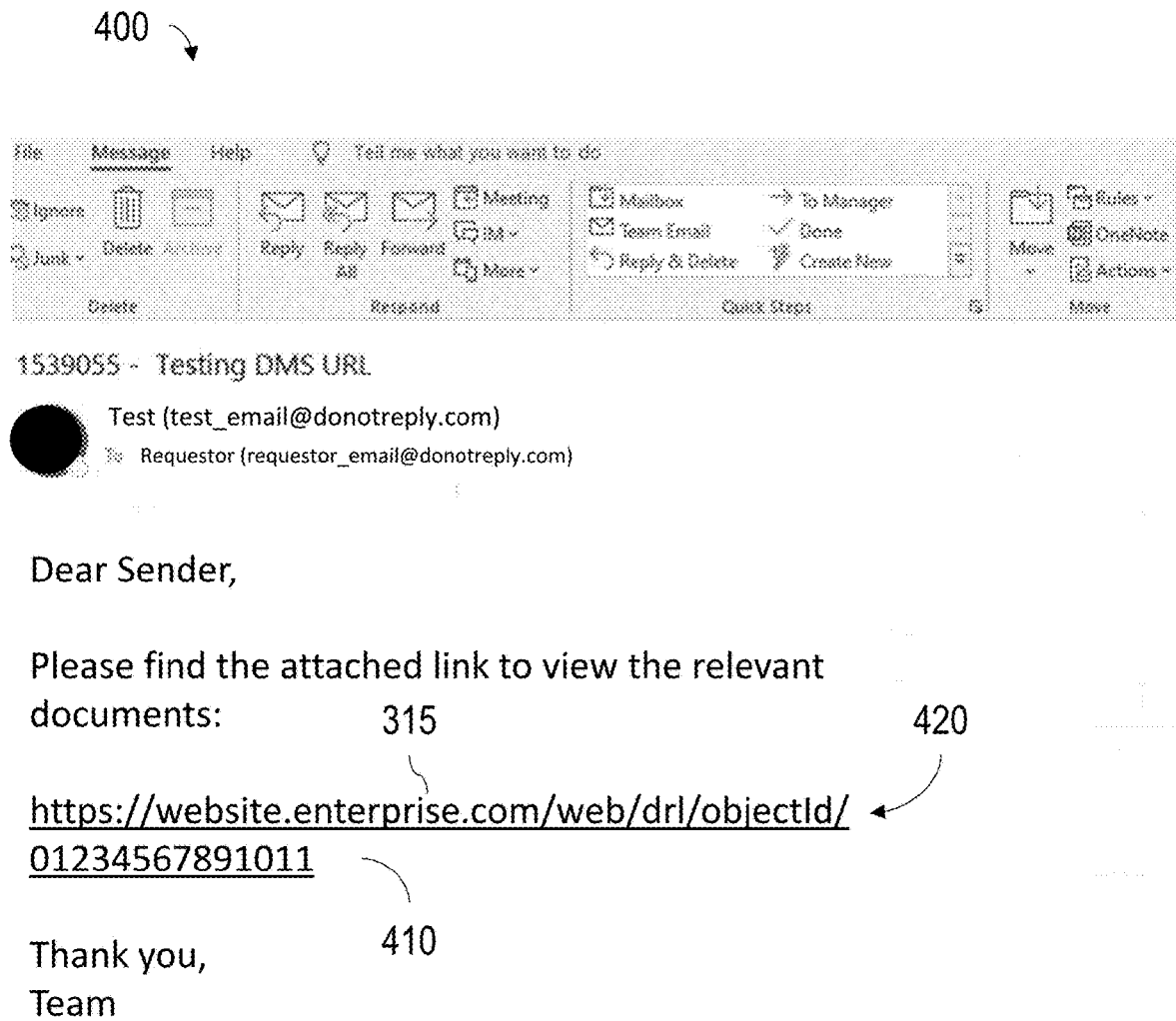

The processing circuit 110 may be configured to perform, by the workflow automation software system 125, the second operation in response to receiving the unique document identifier from the document management system 130. For example, the second operation may be or may include inserting the unique document identifier into the variable portion 410 ("01234567891011" as shown in FIG. 4) of the string to form a modified string 420 (https://website.enterprise.com/web/drl/objectId/01234567891011 as shown in FIG. 4) including the fixed portion 315 ("https://website.enterprise.com/web/drl/objectId/" as shown in FIG. 4). In some embodiments, the second operation may be or may include inserting a variation of the unique document identifier into the variable portion of the string to form the modified string. For example, the variable portion may include a tokenized document identifier. In some embodiments, the document management system 130 may be configured to provide a tokenized unique document identifier. The workflow automation software system 125 may be configured to provide the tokenized unique identifier in the modified string, as another example. In various embodiments, the modified string identifies the computer file. For example, the modified string may correspond to a location of the computer file within the document management system 130 (e.g., a network location directly corresponding to a location of the computer file). The modified string may be or may include a uniform resource locator (URL) corresponding to a network location of the computer file within the document management system 130 or elsewhere in system 100.

In some embodiments, the processing circuit 110 may be configured to receive a user input to the first graphical user interface 300 to receive the unique document identifier. For example, as shown in FIG. 3, a user of the workflow automation software system 125 may select one or more portions of the string 310 within the body 305 of the email and enter the document identifier or a variation of the document identifier into the variable portion 320 (e.g., by providing an indication to select the variable portion, by receiving a keyboard input to the computing system 105 to provide the unique identifier, etc.).

The processing circuit 110 may be configured to transmit the email message to an email address of the second user. For example, the processing circuit 110 may be configured to transmit the email message by the workflow automation software system 125 via the email server 140. The body of the transmitting email message may include the modified string as a uniform resource locator (URL) that allows the second user to access via the document management system 130. For example, the second user may select the URL to locate and access the computer file within the document management system 130 without accessing the workflow automation software system 125. In some embodiments, the processing circuit 110 may be configured to transmit the email message via the email server 140 communicably coupled to the workflow automation software system 125 and to the computing system 105 through the network 135.

In some embodiments, the processing circuit 110 may be configured to transmit the email message to an email address of the second user in response to a user input to the first graphical user interface 300 of the workflow automation software system 125. For example, as shown in FIG. 3, a user of the workflow automation software system 125 may be able to provide an indication to send the email to the second user (e.g., the external user) by selection the send to user button 330. In response to a user selecting the button 330, the processing circuit 110 may be configured to transmit the email message including the body 305 of the message to the email address received in the request. In some embodiments, a user of the workflow automation software system 125 may alternatively and/or additionally have the option to cancel the email message by selecting the cancel button 325. In some embodiments, the processing circuit 110 resolves the query in response to sending the email message to the second user. Providing a link to a distinct document within the workflow automation software system to a user without access to the workflow automation software system as described may provide various improvements over existing systems. For example, a typical workflow automation software system would not provide a user access to a distinct document within a workflow automation software system if the user is not authorized to access the workflow automation software system (e.g., for not having a license). However, the present solution can nonetheless provide the user access direct access to specific documents associated with various processes in the workflow automation software system via the document management system. This improves the functioning of computing devices by providing alternative means of accessing specific computer files while reducing unnecessary security risks of providing additional users access to the workflow automation software system, and without requiring users to search for specific documents among hundreds or thousands of potential files in the document management system in an attempt to locate the correct version of the correct file that is needed.

Referring now to FIG. 4, an example of a second graphical user interface 400 is shown. For example, the interface manager 150 and/or the processing circuit 110 may be configured to provision the second graphical user interface 400 on a computing system 105 of the second user. As described above, in some embodiments, the first graphical user interface 300 and the second graphical user interface 400 may be provisioned on the same computing system 105. In some embodiments, the first graphical user interface 300 and the second graphical user interface 400 may be provisioned on separate computing systems 105. The second graphical user interface 400 may be or may include a user interface of a default email server of the second user (e.g., "Microsoft Outlook", "Gmail," and so on). As shown in FIG. 4, the second user may receive the email message including the string 410 where the string 410 includes the fixed portion 315 and the document identifier within the variable portion 420. The second user may access the computer file within the document management system 130 by selecting the string 410, which may be presented as a hyperlink (e.g., a URL), as indicated by the underlining of the string 420.

Figure 5:
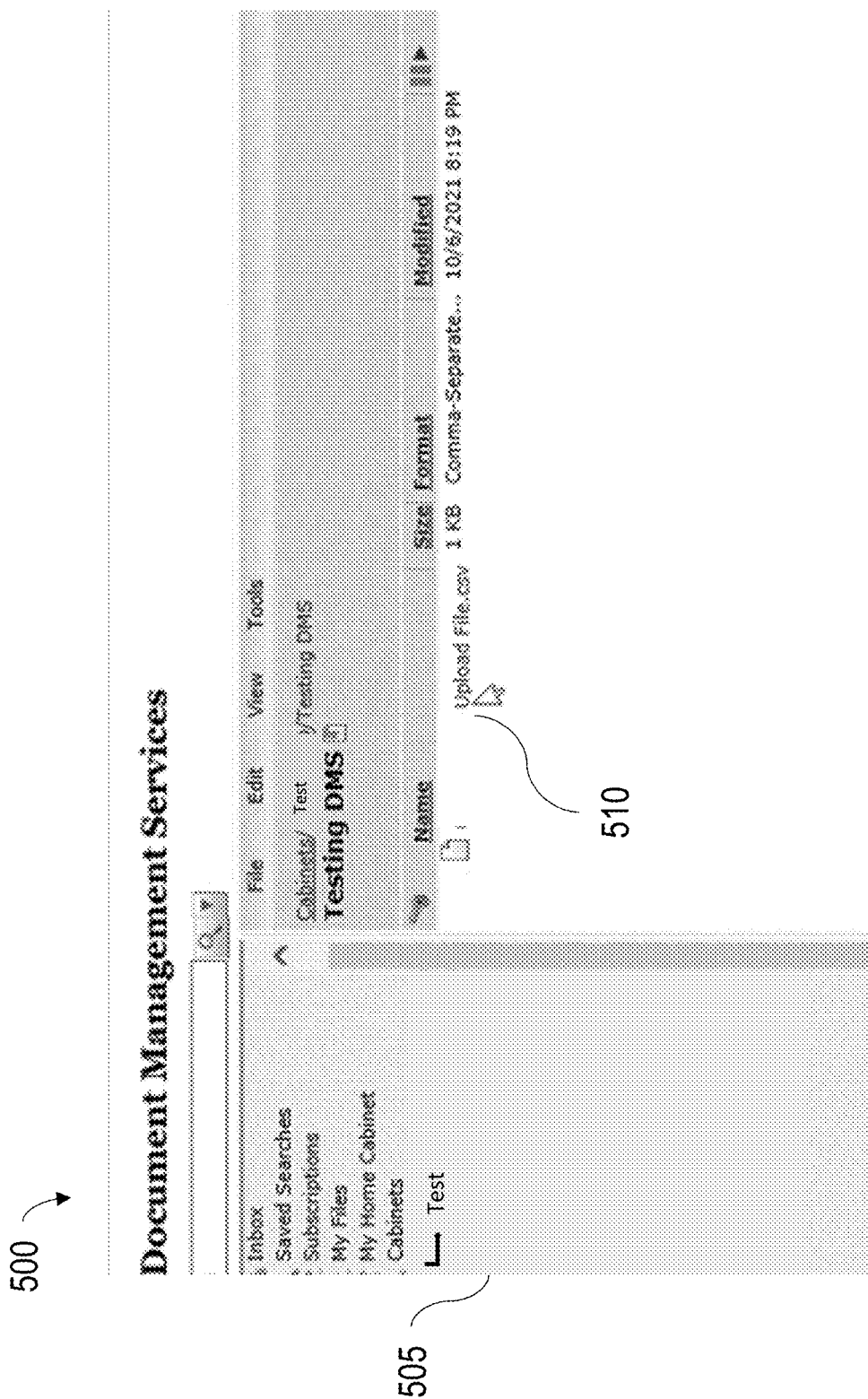

Referring now to FIG. 5, an example of a third graphical user interface 500 is shown. For example, the interface manager 150 and/or the processing circuit 110 may be configured to provision the third graphical user interface 500 on a computing system 105 of the second user in response to the second user selecting the URL (or other hyperlink) in the second graphical user interface 400. The third graphical user interface 500 may be or may include a user interface of the document management system 130 (e.g., "Microsoft SharePoint," "eFileCabinet," and so on). In some embodiments, the third graphical user interface 500 may include an index 505 showing the location of the computer file within the document management system 130. In some embodiments, the third graphical user interface 500 may include the computer file 510. For example, as described above, the string 310 may correspond to a direct network location of the computer file within the document management system 130 such that, when the second user selects the string 410, the third graphical user interface 500 takes the user to the particular network location of the corresponding computer file 510. In some embodiments, the third graphical user interface 500 provides the network location of the computer file 510 within a cabinet or folder of the document management system 130 without providing the second user with the other documents within that cabinet or folder (e.g., the network location corresponds only to specific computer file(s) and not to the cabinet as a whole). Providing access to a distinct document as described provides various improvements over existing systems. For example, a typical document storage system would not generally provide a user access only to a distinct document within a document management system without providing access to the entire document management system. However, the present solution may provide a user directly to a network location of a distinct document by using a unique document identifier corresponding to the document. This improves the functioning of computing devices by providing additional means of accessing a document while reducing unnecessary security risks. The user may be limited to accessing only a limited, select subset of documents that are needed by the particular user and not others.

Figure 6:
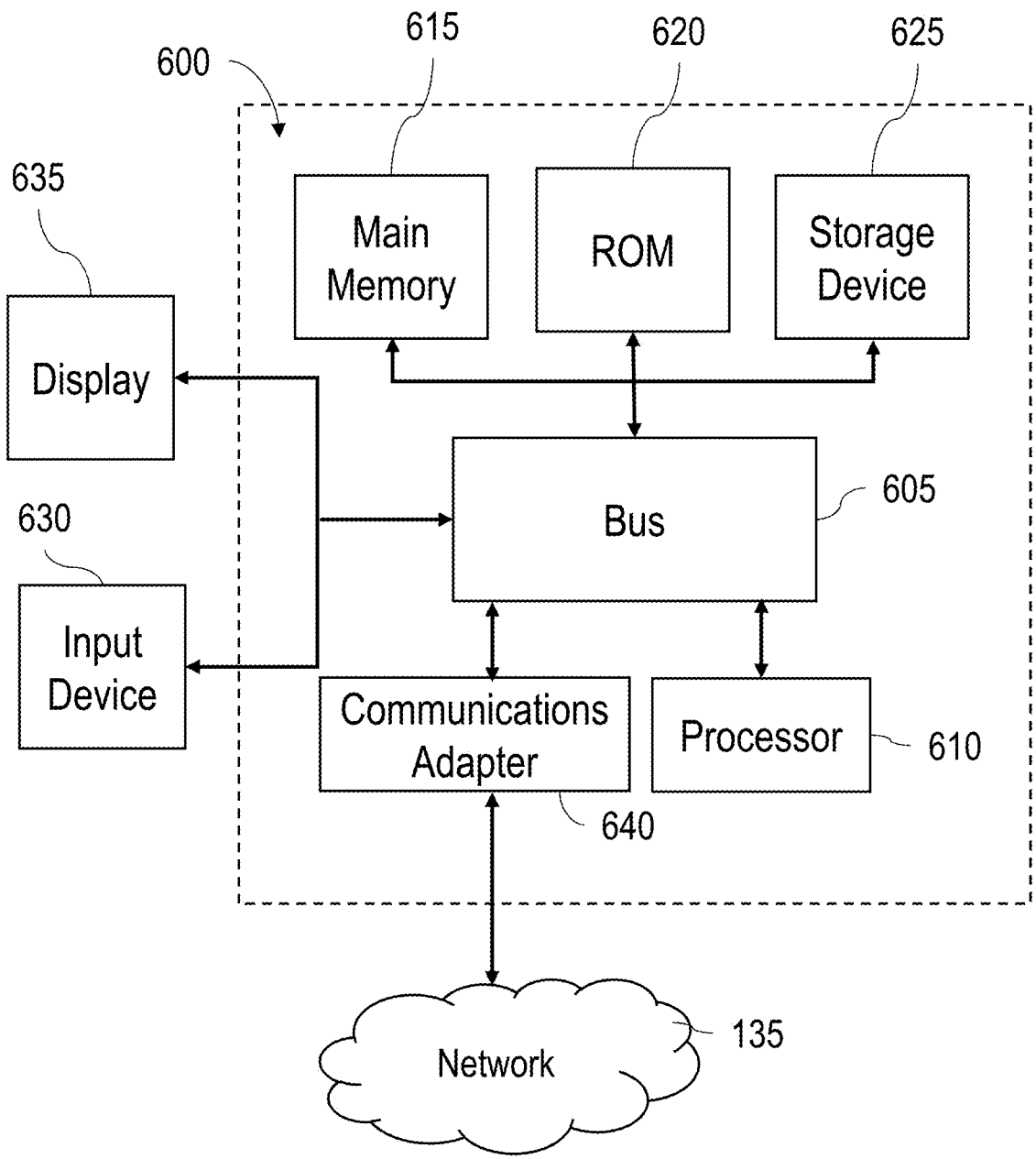
FIG. 6 is a block diagram illustrating an example computing system, in accordance with various potential embodiments.

Referring now to FIG. 6, a depiction of a computer system 600 is shown. The computer system 600 that can be used, for example, to implement a computing system 105, workflow automation software system 125, document management system 130, and/or various other example systems described in the present disclosure. The computing system 600 includes a bus 605 or other communication component for communicating information and a processor 610 coupled to the bus 605 for processing information. The computing system 600 also includes main memory 615, such as a random-access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid-state device, magnetic disk, or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another arrangement, the input device 630 has a touch screen display 635. The input device 630 can include any type of biometric sensor, a cursor control, such as a mouse, a trackball, or cursor direction keys, or a microphone (for audio commands) for communicating direction information and command selections to the processor 610 and for controlling cursor movement on the display 635.

In some arrangements, the computing system 600 may include a communications adapter 640, such as a networking adapter. Communications adapter 640 may be coupled to bus 605 and may be configured to enable communications with a computing or communications network 135 and/or other computing systems. In various illustrative arrangements, any type of networking configuration may be achieved using communications adapter 640, such as wired (e.g., via Ethernet), wireless (e.g., via WiFi, Bluetooth), satellite (e.g., via GPS) pre-configured, ad-hoc, LAN, WAN.

According to various arrangements, the processes that effectuate illustrative arrangements that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 6, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 6 as singular, stand-alone devices, one of ordinary skill in the art will appreciate that, in some arrangements, the computing system 600 may comprise virtualized systems and/or system resources. For example, in some arrangements, the computing system 600 may be a virtual switch, virtual router, virtual host, and/or virtual server. In various arrangements, computing system 600 may share physical storage, hardware, and other resources with other virtual machines. In some arrangements, virtual resources of the network 135 (e.g., network 135 of FIG. 1) may include cloud computing resources such that a virtual resource may rely on distributed processing across more than one physical processor, distributed memory, etc.

Figure 7:
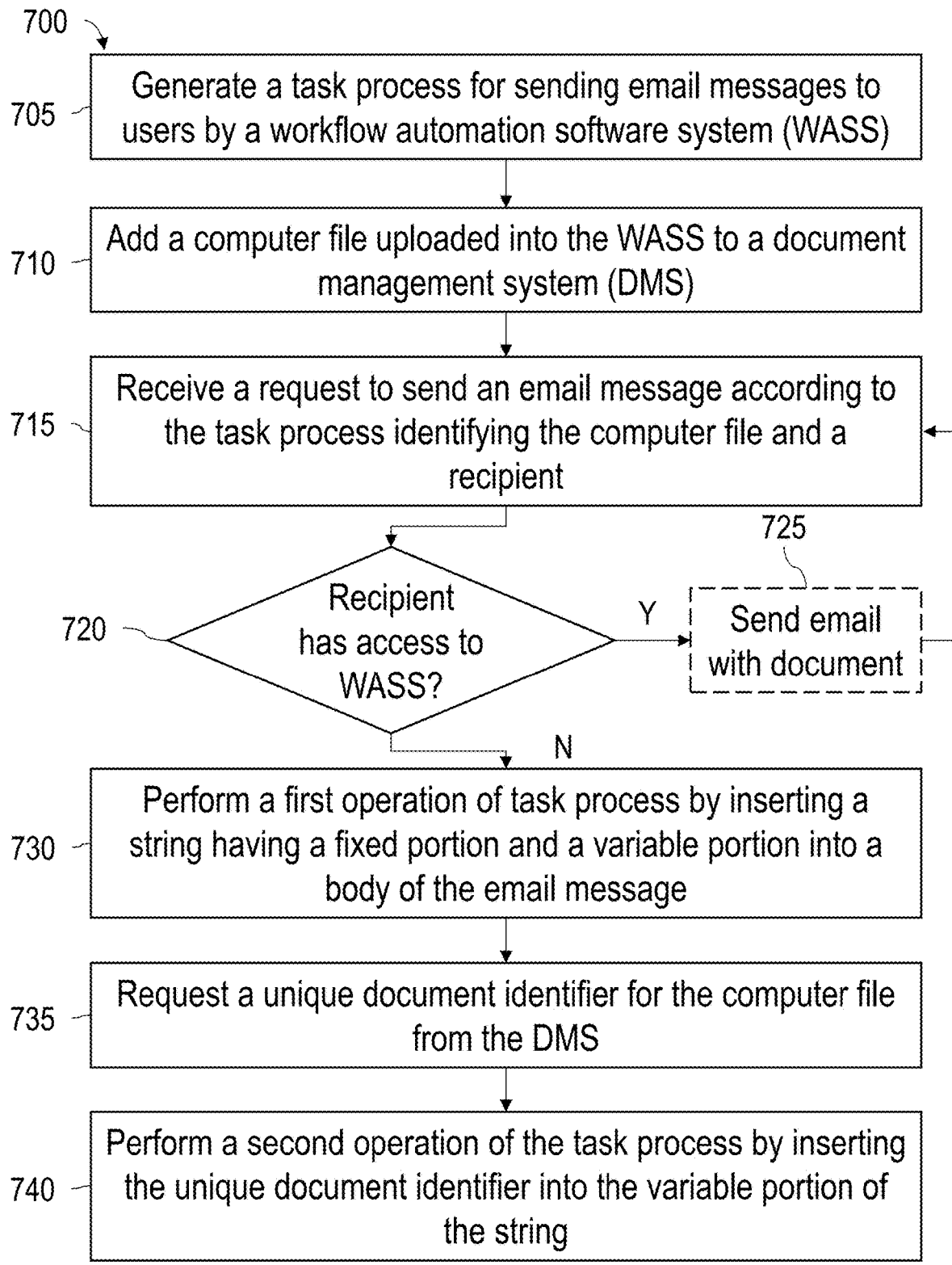
FIG. 7 is a flow diagram depicting a method of uploading and linking functionality between a distinct document and one or more workflow management systems, in accordance with various potential embodiments.

Referring now to FIG. 7, depicted is a flowchart showing a method 700 of uploading and linking functionality between a distinct document and one or more workflow automation software systems, according to an illustrative embodiment. The steps of the method 700 may be performed by one or more of the components described above with reference to FIG. 1-FIG. 6.

As an overview, the processing circuit 110 of the computing system 105 may generate a task process for sending email messages to users by the workflow automation software system 125 at step 705. At step 710, the processing circuit 110 may add a computer file uploaded into the workflow automation software system 125 to the document management system 130. At step 715, the processing circuit 110 may receive a request to send an email message according to the task process identifying the computer file and a recipient. At step 720, the processing circuit 110 may determine if the recipient has access to the workflow automation software system 125. Based on this step, the processing circuit 110 may perform a first operation of a task process of the workflow automation software system 125 by inserting a string having a fixed portion and a variable portion into a body of the email message at step 730 or the processing circuit 110 may optionally send an email with a link to the document directly in the workflow automation software system 125 at optional step 725 or the processing circuit 110 may skip optional step 725 and return to step 715 where the processing circuit 110 may receive another request to send an email message.

In greater detail, at step 705, the processing circuit 110 of the computing system 105 may generate a task process for sending email messages to users by the workflow automation software system 125. As described in greater detail above with reference to FIGS. 1 and 2, the processing circuit 110 may generate a task process in response to receiving one or more user inputs to the computing system 105. In some embodiments, the task process includes at least two operations. In some embodiments, at least one of the operations of the task process are defined by a user via the workflow automation software system 125 (e.g., based on user inputs to the workflow automation software system 125).

In greater detail, at step 710, the processing circuit 110 may add a computer file uploaded into the workflow automation software system 125 to the document management system 130. In some embodiments, the computer file is uploaded to the computing system 105 before adding the computer file to the document management system 130, as described in greater detail above. For example, in some embodiments, a user of the computing system 105 may upload the computer file to the computing system 105 (e.g., such that the computer file is stored in memory of the computing system 105) and the processing circuit 110 may add the previously uploaded computer file into the workflow automation software system 125. In some embodiments, the computer file is uploaded to a network location accessible via the workflow automation software system 125. For example, the computer file may be uploaded to a network (e.g., network 135) and the network location may include an identifier associated with the computer file. In these embodiments, the processing circuit 110 may provide the network location to the document management system 130 such that one or more components of the document management system 130 may generate a unique document identifier in response to receiving the network location. In some embodiments, the computer filed is stored at a first network location accessible via the workflow automation software system 125 such that the processing circuit 110 may add the computing file to the document management system 130 by copying, by the workflow automation software system 125, the computer file to a second network location accessible via the document management system 130.

In greater detail, at step 715, the processing circuit 110 may receive a request to send an email message via the workflow automation software system 125 according to the task process. For example, the request may identify the computer file and a recipient. In some embodiments, the request may identify the computer file as an attachment to the email message. In some embodiments, the request may provide the email address to the workflow automation software system 125. For example, in some embodiments, the request may be or may include an email message from a requester to a common mailbox monitored via the workflow automation software system 125. A user of the workflow automation software system 125 (e.g., via the computing system 105) may receive the email request including an attachment to the email identifying the computer file and an email address (or similar address) corresponding to the recipient.

In greater detail, at step 720, the processing circuit 110 may determine if the identified recipient in the request (e.g., the recipient corresponding to the provided email address, the recipient to receive the computer file) has access to the workflow automation software system 125. For example, the processing circuit 110 may determine if the recipient has a license to access the workflow automation software system 125. The processing circuit 110 may determine if the recipient has authorization to access the workflow automation software system 125, as another example.

Following the processing circuit 110 determining that the recipient does have access to the workflow automation software system 125, the processing circuit 110 may proceed to optional step 725 where the processing circuit 110 may send an email message to the recipient with access to the document (e.g., a URL) to the document either via the workflow automation software system 125 or the document management system 130. The processing circuit 110 may alternatively and/or additionally return to step 715 where the processing circuit 110 may receive another request to send an email message according to the task process. In some embodiments, the processing circuit may continue to step 730 even if the processing circuit determines that the recipient does have access to the workflow automation software system 125.

Following the processing circuit 110 determining that the recipient does not have access to the workflow automation software system 125, the processing circuit 110 may proceed to step 730 where the processing circuit 110 may perform the first operation of the task process by inserting a string having a fixed portion and a variable portion into a body of the email message. For example, as described in greater detail above, the fixed portion may correspond to a network location of the document management system 130 and the variable portion may correspond to the document file.

At step 735, the processing circuit 110 may request a unique document identifier for the computer file from the document management system 130. For example, as described in greater detail above, the unique document identifier may be or may include a unique document number generated by one or more components of the document management system 130 to identify the distinct computer file within the document management system 130. In some embodiments, the processing circuit 110 may prompt a user of the workflow automation software system 125 to provide the unique document identifier for the computer file from the document management system 130 (e.g., via the computing system 105).

At step 740, the processing circuit 110 may perform the second operation of the task process by inserting the unique document identifier into the variable string portion of the string. For example, in some embodiments, the processing circuit 110 may prompt a user of the workflow automation software system 125 to provide the unique document identifier into the variable portion of the string within the body of the email message. In some embodiments, the first and second operations create a modified string within the body of the email that uniquely identifies the computer file, such as a URL to the computer file within the document management system 130. It should be appreciated that, as indicated above, in various embodiments, the variable portion may correspond to, for example, one file, multiple files, one folder, or multiple folders.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for providing the overall system or portions of the embodiments might include general purpose computing in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
generating, by a workflow automation software system (WASS) executing on a first computing system, a task process configured for sending electronic mail (email) messages to users who do not have access to the WASS, the task process comprising a first operation and a second operation;
adding, by the WASS, to a document management system (DMS) that is separate from the WASS, a computer file uploaded into the WASS, wherein the computer file is stored at a first network location accessible via the WASS, and wherein adding the computer file to the DMS comprises copying, by the WASS, the computer file to a second network location accessible via the DMS;
receiving, by the WASS, from a first user with access to the WASS, a request to send an email message according to the task process, wherein the request identifies (1) the computer file and (2) a recipient who is a second user without access to the WASS;
performing, by the WASS, the first operation in response to receiving the request to send the email message, the first operation comprising inserting into a body of the email message a string having a fixed portion and a variable portion, wherein the fixed portion corresponds to the DMS;
requesting, by the WASS, from the DMS, a unique document identifier for the computer file;
performing, by the WASS, the second operation in response to receiving the unique document identifier from the DMS, wherein the second operation comprises inserting, into the variable portion of the string, the unique document identifier or a variation of the unique document identifier to form a modified string comprising the fixed portion; and
transmitting, by the WASS, via an email server, the email message to an email address of the second user, the body of the transmitted email message comprising the modified string as a uniform resource locator (URL) that allows the second user to access via the DMS the computer file without accessing the WASS.

2. The method of claim 1, wherein the fixed portion of the string comprises a network location corresponding to the DMS.

3. The method of claim 1, wherein the modified string inserted into the body of the email uniquely identifies the computer file.

4. The method of claim 1, wherein the first and second operations are defined by the first user via the WASS.

5. The method of claim 1, further comprising uploading the computer file to the first computing system before adding the computer file to the DMS.

6. The method of claim 1, wherein the computer file is uploaded to a network location accessible via the WASS, and wherein adding the computer file to the DMS comprises providing the network location to the DMS, wherein the DMS generates the unique document identifier after receiving the network location.

7. The method of claim 1, wherein the request comprises identifying the computer file as an attachment to the email message and providing the email address to the WASS.

8. A computing system comprising a processor and a memory comprising instructions that, when executed by the processor, cause the processor to:
generate, by a workflow automation software system (WASS), a task process configured for sending electronic mail (email) messages to users who do not have access to the WASS, the task process comprising a first operation and a second operation;
add, by the WASS, to a document management system (DMS) that is separate from the WASS, a computer file uploaded to the WASS, wherein the computer file is stored at a first network location accessible via the WASS, and wherein adding the computer file to the DMS comprises copying, by the WASS, the computer file to a second network location accessible via the DMS;
receive, by the WASS, from a first user with access to the WASS, a request to send an email message according to the task process, wherein the request identifies (1) the computer file and (2) a recipient who is a second user without access to the WASS;
perform, by the WASS, the first operation in response to receiving the request to send the email message, the first operation comprising inserting into a body of the email message a string having a fixed portion and a variable portion, wherein the fixed portion corresponds to the DMS;

request, by the WASS, from the DMS, a unique document identifier for the computer file;

perform, by the WASS, the second operation in response to receiving the unique document identifier from the DMS, wherein the second operation comprises inserting, into the variable portion of the string, the unique document identifier or a variation of the unique document identifier to form a modified string comprising the fixed portion; and transmit, by the WASS, via an email server, the email message to an email address of the second user, the body of the transmitted email message comprising the modified string as a uniform resource locator (URL) that allows the second user to access via the DMS the computer file without accessing the WASS.

9. The computing system of claim 8, wherein the fixed portion of the string comprises a network location corresponding to the DMS.

10. The computing system of claim 8, wherein the modified string inserted into the body of the email uniquely identifies the computer file.

11. The computing system of claim 8, wherein the first and second operations are defined by the first user via the WASS.

12. The computing system of claim 8, wherein the computer file is uploaded to a network location accessible via the WASS, and wherein adding the computer file to the DMS comprises providing the network location to the DMS, wherein the DMS generates the unique document identifier after receiving the network location.

13. The computing system of claim 8, wherein the request comprises identifying the computer file as an attachment to the email message and providing the email address to the WASS.

14. A non-transitory computer-readable storage medium comprising instructions that, when executed by a processor, cause the processor to:

generate, by a workflow automation software system (WASS), a task process configured for sending electronic mail (email) messages to users who do not have access to the WASS, the task process comprising a first operation and a second operation;

add, by the WASS, to a document management system (DMS) that is separate from the WASS, a computer file uploaded to the WASS, wherein the computer file is stored at a first network location accessible via the WASS, and wherein adding the computer file to the DMS comprises copying, by the WASS, the computer file to a second network location accessible via the DMS;

receive, by the WASS, from a first user with access to the WASS, a request to send an email message according to the task process, wherein the request identifies (1) the computer file and (2) a recipient who is a second user without access to the WASS;

perform, by the WASS, the first operation in response to receiving the request to send the email message, the first operation comprising inserting into a body of the email message a string having a fixed portion and a variable portion, wherein the fixed portion corresponds to the DMS;

request, by the WASS, from the DMS, a unique document identifier for the computer file;

perform, by the WASS, the second operation in response to receiving the unique document identifier from the DMS, wherein the second operation comprises inserting, into the variable portion of the string, the unique document identifier or a variation of the unique document identifier to form a modified string comprising the fixed portion; and transmit, by the WASS, via an email server, the email message to an email address of the second user, the body of the transmitted email message comprising the modified string as a uniform resource locator (URL) that allows the second user to access via the DMS the computer file without accessing the WASS.

15. The storage medium of claim 14, wherein the fixed portion of the string comprises a network location corresponding to the DMS.

16. The storage medium of claim 14, wherein the modified string inserted into the body of the email uniquely identifies the computer file.

17. The storage medium of claim 14, wherein the computer file is uploaded to a network location accessible via the WASS, and wherein adding the computer file to the DMS comprises providing the network location to the DMS, wherein the DMS generates the unique document identifier after receiving the network location.

* * * * *